United States Patent [19]
Glover

[11] Patent Number: 5,741,346
[45] Date of Patent: Apr. 21, 1998

[54] MINERAL AND ORGANIC FERTILIZER

[75] Inventor: Alexander S. Glover, Winston-Salem, N.C.

[73] Assignee: Vulcan Materials Company, Winston Salem, N.C.

[21] Appl. No.: 657,728

[22] Filed: May 30, 1996

(Under 37 CFR 1.47)

[51] Int. Cl.$^6$ ............................................. C05F 3/00
[52] U.S. Cl. ........................ 71/15; 71/20; 71/21; 71/63
[58] Field of Search ................................. 71/15, 20, 21, 71/63

[56] References Cited

U.S. PATENT DOCUMENTS

| | | | |
|---|---|---|---|
| 17,237 | 5/1857 | Stearns | 71/13 |
| 19,974 | 4/1858 | Spieker | 71/62 |
| 144,877 | 11/1873 | Stevens | 71/15 |
| 462,476 | 11/1891 | Doughty | 71/13 X |
| 1,397,629 | 11/1921 | Fry | 71/21 |
| 4,023,955 | 5/1977 | Muelller | 71/64.11 |
| 5,085,681 | 2/1992 | Boukidis | 71/29 |
| 5,228,895 | 7/1993 | Kelly et al. | 71/63 |
| 5,422,015 | 6/1995 | Angell et al. | 71/12 X |
| 5,468,276 | 11/1995 | Roth et al. | 71/15 |
| 5,482,528 | 1/1996 | Angell et al. | 71/12 |

FOREIGN PATENT DOCUMENTS

| 0122560 | 10/1978 | Japan | 71/15 |

OTHER PUBLICATIONS

Tschernich, Rudy, W. "*Zeolites of the World,*" Geoscience Press, Inc., Pheonix, AZ 1992, p. 3.

"Hog Heaven–and–Hell", U.S. *New and World Report,* Jan. 22, 1996, v120(3): pp. 55–59, Stachell, Michael.

"Hogging the Table", *Time,* Mar. 18, 1996, v147(12) p. 76(1), Greenwald, John.

"Pelletization solution to fines–handling problem", *Pit & Quarry,* Jun., 1993, v85, pp. 30–37, Paul, Dr. Bradley C., et al.

"Solid Waste Composting Project Update", *BioCycle,* May 1991, vol. 32, No. 5, pp. 38–39. Goldstien, Nora.

*Primary Examiner*—Ferris Lander
*Attorney, Agent, or Firm*—Burns, Doane, Swecker & Mathis, L.L.P.

[57] ABSTRACT

The present invention relates to an agricultural fertilizer prepared from animal waste, rock fines, and optionally other ingredients to improve its performance. The process for preparing this fertilizer is within the scope of this invention.

12 Claims, No Drawings

MINERAL AND ORGANIC FERTILIZER

BACKGROUND OF THE INVENTION

Since ancient times animal waste has been used as an agricultural fertilizer. Today both the developing and industrialized nations use animal manure as a supplemental or primary fertilizer. It is ecologically beneficial and appealing to have waste materials recycled into useful resources. However, without treatment and drying, animal waste is often difficult to spread with conventional farm equipment, unstable during transport and storage, and can be a health hazard to man and domestic animals. Such treatment increases the cost to the point that often animal waste fertilizer cannot compete economically with chemical fertilizers. Further, animal waste fertilizer may be inconsistent from batch to batch and may be lacking in essential and trace elements often necessitating that these missing elements be added to the soil using supplement sources.

The art contains numerous examples of ingredients being added to manure to improve its properties as a fertilizer. For example, U.S. Pat. No. 5,468,276 teaches a combination of animal manure and flyash to yield a stable fertilizer. U.S. Pat. No. 462,476 (issued 1891) teaches a combination of human feces and calcium carbonate as an improved fertilizer.

Modern, large scale animal production practice, such as found in the hog, poultry, and beef industries, places large numbers of animals in close quarters in barns. The waste from these animals is periodically flushed out with jets of water and collected outside the barns in large, open "lagoons." In these lagoons anaerobic bacteria digest the waste leaving a "biosolid," at the bottom and a fluid portion on top. While this biosolid is rich in plant nutrients, it suffers from the historic problems of animal waste fertilizer, in that it is difficult to use, store and transport without dewatering, drying and further costly treatment.

In the case of the hog industry, often the biosolid is produced at a much greater rate than it can be used on surrounding farm land, and accumulates in large quantities posing environmental problems. In Eastern North Carolina, for example, lagoon storage areas have become completely filled and fluid upper layers have spilled into river systems causing widespread pollution. See "Hogging the Table," *Time*, Mar. 18, 1996 and "Hog Heaven-and Hell," *U.S. News and World Report*, Jan. 22, 1996. There has been no cost effective means of dewatering, drying, and converting the biosolid from hog waste into a practical, balanced fertilizer.

Various rock compositions are quarried, mixed, and crushed to produce aggregate which is used in concrete, mad beds, drainage beds, and a variety of construction applications. Typically, large pieces of rock are broken loose by blasting from natural formations making up the walls and floor of the quarry. These large pieces are mechanically crushed in multiple stages, and the resulting fragments screened to sort by size. Rock crashing generates a significant amount of particles finer than about −50 meshes (0.297 mm). The fragments from the rock crushing process are generally washed or screened to remove these fine particles. The resulting wash suspensions are conveyed to a rotary dewatering auger which removes particles the size of fine sand, i.e., about −50 to about −100 mesh (0.149 mm). The remaining finer particles (less than −100 mesh), known as "fines," are floated out in the effluent water discharge and fed to gravity settling ponds where the fines form sediment.

Until recently fines had limited commercial value and were generally viewed as a nuisance by-product, and their environmentally sound disposal added to the overhead cost of operating a quarry. Now the frees have been found to contain high value micro nutrient minerals and to be useful in soil "reminerization." The fines are dried to about 90% solids state by mechanical/chemical filter-press system, convection dryers, and other systems. The frees are sold as soil amendment material. While fines are useful in restoring many minor and trace elements to the soil, they benefit plants most when used in conjunction with other material to obtain the levels of nitrogen, phosphorus and potassium (NPK) required in a complete and balanced fertilizer.

It has now been found that animal waste, in particular biosolid dredged from the bottoms of animal waste lagoons, e.g., hog waste lagoons, can be blended with fines from rock crushing and treated to produce a cost effective, agricultural fertilizer which is high in plant nutrients, stable in transport and storage, and spreadable with conventional equipment.

SUMMARY OF THE INVENTION

The first aspect of this invention is an essentially dry fertilizer composition comprising a blend of animal waste, rock fines, optionally supplemental plant nutrients, optionally soil conditioners, optionally agents to improve color, odor, flow, and other physical properties.

The second aspect of the present invention is the process for preparing the fertilizer of the first aspect comprising the steps of:

a) blending dewatered animal waste with fines, optionally supplemental plant nutrients, optionally soil conditioners, and optionally agents to improve color, odor, flow, and other physical properties to form a uniform, amorphous blend;

b) optionally forming the blend into pellets;

c) heating the blend, amorphous or as pellets, at a temperature and for a period of time, sufficient to destroy residual pathogens and dry it to a stable moisture level.

DETAILED DESCRIPTION OF THE INVENTION

As used herein the terms "animal waste,""feces," and "manure" are synonymous and mean the solid or semi-solid excrement of animals (including humans) and includes urine when it cannot be separated. The terms; "fines," and "rock dust," are synonymous herein and mean the product of rock crushing operations having a mesh size of −50 mesh (0.297 mm) or finer. The terms "agricultural fertilizer" and "fertilizer" as used herein are consistent with their broader, common meaning, i.e., any material, added to the soil in which plants are grown to provide nutrients to the plants and promote their growth.

"Dewatering" means removal of as much water as is practical with a given mechanical means such as filtering, pressing, decanting, centrifuging, or straining. The term "pathogen" means microorganisms which cause or promote diseases in plants or humans and other animals.

The fertilizer of the present invention provides soil with a balance of plant nutrients. That is, it provides the major nutrient elements of nitrogen (N), phosphorous (P), and potassium (K) (collectively, "NPK") as well as minor and trace elements such as sulfur (S), boron (B), molybdenum (Mo), chlorine (Cl), zinc (Zn), copper (Cu), magnesium (Mg), manganese (Mn), calcium (Ca), cobalt (Co), and iron (Fe). Its high organic content enhances the soil's ability to retain moisture, promote soil microbial activity, and promote plant mot formation. Further, it does not have the tendency to "burn" plants if used in excess as do some chemical fertilizers. Additionally the cationic (+charge) characteristics of rock fines help attract or hold nitrogen in the form of nitrate or nitrite (−charge) to prevent leaching.

In the fertilizer of the present invention, the fines are bonded to particles of animal waste which stabilizes the animal waste and add nutrients not found in animal waste alone. This fertilizer, because of its combination of organic and mineral components also serves as a soil conditioner.

While the fertilizer of the present invention in its most basic form, i.e., a blend of animal waste and rock frees, is effective in promoting plant growth, it may be desirable to increase one or more of the nutrients by the addition of optional ingredients, i.e., supplemental plant nutrients. For example, ground phosphate rock, e.g., calcium phosphate, may be added to increase the relative amount of available phosphorous and calcium and ground potash may be added to increase available potassium. Likewise, ammonium nitrate, urea, or other nitrogen sources may be added to increase the available nitrogen. Soil conditioners may be added to help the soil retain moisture, promote better drainage, or adjust the pH of the soil. It may also be desirable to added optional ingredients to improve the color, odor, flow, and other physical properties. Thus, the fertilizer of the present invention can be tailored through blending to match the needs of particular plants or agricultural systems and several variations might be marketed depending on the relative amounts of optional ingredients. Each batch of fertilizer is analyzed for nutrient content, and the additional nutrients may be added to maintain a consistent product from batch to batch.

The fertilizer of the present invention is applied to the soil in a similar manner and at similar rates as fertilizers in current use with corresponding NPK values. That is, those preparing agricultural lands for planting may use conventional fertilizing techniques of the art and readily available spreading equipment for the fertilizer of the present invention.

In general, raw animal waste when kept moist or in a liquefied state, e.g., a suspension or slurry, is rapidly digested by naturally occurring microorganisms, e.g., anaerobic bacteria, to yield a material that has significantly less offensive odor, is low in pathogens, and is high in plant nutrients. This natural occurring digestion process is employed in municipal sewage treatment plants and septic system to render human waste into a form that can be processed for release into rivers or for working into the soil. In large scale animal production, especially poultry and hog operations, where the solid and liquid animal waste are flushed from the animals' quarters with water, the bacterial digestion takes place in large collecting ponds know as "lagoons" in the vicinity of the animal facility. During the digestion process the raw waste which enters the lagoon as slurry or suspension is transformed into a biosolid, which sinks to the bottom of the lagoon, and supernatant liquid.

Biosolid is dredged from an animal waste lagoon. Alteratively, the supernatant liquid can be drained or pumped off and the biosolid can then be dug out or pumped out with conventional material handing systems. In either case, the biosolid is then dewatered by mechanical means such as filtering, air drying, pressing, centrifugation, decanting, or straining. The biosolid is blended by mechanical agitation with fines in the ratio ranging from about 80:20 to about 20:80 biosolid to fines and optional ingredients. While the preferred ratio will vary with the nutrient content of both the fines and the biosolid, as well as the desired nutrient combination to be delivered to the soil, a typical blend is in the range of about 40:60 to about 60:40.

The fines may be heated from about 85° C. up to about 500° C. just prior to blending with the biosolid to promote drying of the biosolid and to kill residual pathogens. Optional ingredients may be added prior to or during blending. The moisture content of the biosolid and fines blend is adjusted to the range of about 25% to about 10% moisture by additional heating, preferably with agitation, preferably with force air circulation, prior to the pelletizing. Alternatively, the biosolid, fines, and optional ingredients may be blended cold and heated at about 118° C. up to about 500° C., preferably with agitation, after blending until the desired range of moisture content is reached.

The fertilizer of the present invention in an amorphous, non-pelletized form may be used effectively in some applications. However, the pelletized form is generally preferred because of the better flow properties of pellets which facilitates handling and spreading, and pelletizing prevent segregation of materials in the shipping containers. The processed fertilizer is loaded in bags typically used for fertilizer, or shipped in bulk by truck or rail car to local distributors or directly to the customers.

Pelletizing may be accomplished by essentially any means known in the art of fertilizer manufacturing. For example, a disk pelletizer or extruder can be used. The choice of size of fertilizer pellets depends on the method and equipment which will be used to apply the pellets and the appropriate size for any give application is known in the art of fertilizer manufacturing. Normally the pellets are in the range of about 0.5 mm to about 10 mm in diameter and preferably, in the range of 1 mm to 4 mm. However, special applications may require finer or courser pellets which can also be prepared according to the art. The finished pellets may be coated with optional agents to improve color, odor, and flow properties.

Fertilizer pellets may be coated by methods of the art such as drum tumbling in a spray of water soluble polymer such as is normally used in the art of fertilizer pelletization, or encapsulating with partially hydrated cement (see U.S. Pat. No. 4,023,955). It may be desirable to coat several batches with different thickness of coating or different coating materials to achieve a differential rate of release of nutrients from the fertilizer pellets. After coating, the batches are mixed to give a controlled release or sustained release of nutrients. For example, it may be desirable to have some of the nutrients released immediately upon spreading but the bulk of the nutrients released over several months. It may also be desirable to add a coating to keep the pellets from clumping together and, thereby, enhance the flow properties.

For marketing reasons, it may be desirable to add coloring agents at some stage of the preparation of the fertilizer of the present invention. For example, a high nitrogen blend might be colored green while a high phosphorous blend might be brown. Also an ostentatious color such a fluorescent orange might be added so that areas of soil treated by the fertilizer would be clearly noticeable. Likewise, it might be desirable to add odor masking agents.

The fertilizer of the present invention may be prepared from essentially any animal waste. However, Poultry and Hog manures are particular good starting materials because of the large and concentrated volume available. Preferably, the animal waste is bacterially digested. Fines suitable for the present invention come from the crushing metamorphic, igneous, and sedimentary rocks. The frees useful in the present invention contain fertilizer valued elements including S, B, Cl, Mo, Zn, Cu, Mg, Mn, Ca, Co, Fe, K, and P, though all these elements need not be present to the same extent nor everyone need be present.

The following specific examples of the practice of the present invention are offered for the purpose of illustration only and are not to be taken as limiting the scope of the invention.

EXAMPLES

Example 1

Biosolid is dredged from the bottom of a hog waste lagoon and belt pressed to dewater to about 80% or less water content. To 100 Kg of the dewatered biosolid is added with vigorous blending, 100 kg of granite fines, which were previously kiln heated to 200° C. Blending is continued until the blend has a moisture content of about 20% or less. The blend is pelletized in a rotary disk pelletizing apparatus to achieve pellet size in the range of about 1 mm to about 3 mm in diameter with a mean of about 2 mm. The pellets are passed through an air stream where they are heated at 150° C. for fifteen minutes. The dried pellets are screened for size, chemically analyzed, and conveyed to dry storage bins to wait packaging and shipping. The pellets are prepared for shipment by placing them in double layer bags, labeled to indicate the exact nutrient content of the fertilizer and sealed.

Example 2

A fertilizer composition is prepared as in Example 1 except that sufficient finely ground calcium phosphate, (rock phosphate), is added to the fertilizer blend to bring the phosphorous analysis to 10% of the total weight. Also finely crushed limestone is added at the rate of 1 Kg to 10 Kg of blend in order to add calcium and adjust PH.

Example 3

A fertilizer composition is prepared as in Example 1 except that the fines are not heated prior to blending, but the blend is heated in a forced air drying oven at 150° C. until a moisture content of less 20% is reached prior to pelletizing.

Example 4

A fertilizer composition is prepared as in Example 1 except that the starting material is biosolid dredged form a poultry waste lagoon.

I claim:

1. A fertilizer composition consisting essentially of a blend of animal manure and mineral fines derived from crushed rock other than zeolites said crushed rock being selected from the group consisting of igneous, metamorphic and sedimentary rock and said absorbency having substantially no base substitution capacity or moisture absorbency wherein the ratio of manure to the mineral fines is in the range of about 20:80 to about 80:20.

2. The fertilizer composition of claim 1 wherein the animal manure has been digested by microorganisms.

3. The fertilizer composition of claim 1 in the form of pellets ranging from about 0.5 mm to about 10 mm in diameter.

4. The fertilizer composition of claim 1 wherein the mineral fines are derived from crushed granite.

5. The fertilizer composition of claim 1 wherein said blend is formed into pellets and heated in the temperature range of about 85° C. to about 500° C. for at least 15 minutes.

6. The fertilizer composition of claim 1 wherein the manure is hog manure or contains hog manure.

7. The fertilizer composition of claim 1 wherein said composition further contains one or more ingredients selected from the group consisting of supplemental plant nutrients, soil conditioners, colorants, odor suppressing agents, and flow properties enhancing agents.

8. The fertilizer composition of claim 1 wherein the mineral fines are derived from the group consisting of granite, gneiss, and limestone and mixtures thereof and wherein phosphate salts and potassium salts are present as supplemental plant nutrients.

9. A process for manufacturing a fertilizer composition comprising the following steps:

a) blending animal manure with a moisture content of less than about 80% with mineral fines derived from crushed rock other than zeolites said crushed rock being selected from the group consisting of igneous, metamorphic and sedimentary rock and said crushed rock having substantially no base substitution capacity or moisture absorbency wherein the ratio of manure to the mineral fines is in the range of about 20:80 to about 80:20;

b) forming said blend into particles;

c) heating said particles at a temperature and for a time sufficient to kill residual pathogens and reduce their moisture content to less than about 20 %.

10. The process of claim 9 wherein said particles are pellets ranging from about 0.5 mm to about 10 mm in diameter.

11. The process of claim 9 wherein the fines have been heated to a temperature in the range of about 100° C. to about 500° C. just prior to blending.

12. The process of claim 9 wherein said particles are heated in step c) at a temperature in the range of about 85° C. to about 500° C. for at least 15 minutes.

* * * * *